2,952,544
NUT-LIKE FOOD PRODUCT AND PROCESS FOR MAKING

Jack R. Durst and Jolyon A. Stein, Minneapolis, Minn., assignors to The Pillsbury Company, a corporation of Delaware No Drawing. Filed Aug. 29, 1958, Ser. No. 757,942

10 Claims. (Cl. 99—14)

This invention relates to a food, and more particularly to synthetically fabricated nut-like articles and a process for making the same.

Nutmeats are characterized when eaten by their initial firm crispness which is dissipated when they are masticated and palatable oils then become exuded from the mass. The oil component, though considerable, does not separate or evaporate from the natural nutmeat except for a minor surface effect. It has been recognized that a manufactured product simulating nutmeats would be desirable, and several such products have been proposed. In each of the known cases, however, the flavor and oil character on the one hand, or the crispness and texture on the other hand, have been wanting or sacrificed in the production of such prior art simulated nutmeats.

The instant invention contemplates the fabrication of a crisp cellular structure with isolated oil or fat particles filling the voids or cells therein.

To produce products of such structure, the oil components and a dry powdered film-forming substance are admixed in a slurry. Moisture is then added with vigorous beating until the particles of film-forming substance hydrate and coalesce into a continuous cellular phase which isolates and entraps globules of the oil component. Alternatively, the oil components may be admixed with the previously hydrated film-forming substance which admixture is then vigorously agitated to obtain dispersion of the oil component throughout the hydrated film-forming substance, thereby converting said film-forming substance into a continuous phase cellular structure in which globules of the oil component are entrapped. Any other procedure for combining the film-forming and the oil components which will affect the dispersion of the oil component throughout a continuous phase of the hydrated film former is also satisfactory.

Dispersing the oil component throughout the continuous phase of hydrated film former results in a gel-like mass which is then slowly dried with the oil globules in situ whereby the hydrated film former is gradually hardened without displacing any of the oil. If steam or oil vapor pressure is created through the application of too high a temperature during drying, the cellular structure will rupture and the oil particles will coalesce and bleed from the product. Hence, the drying is conducted over a relatively greater period of time as compared to the time required for forming the gel-like structure. The product, when dried to a low moisture content, has the characteristic crisp and oily character of natural nutmeats and, if the ingredients are selectively employed, may result in a product capable of being roasted to simulate nutmeats and even particular varieties of nutmeats.

It has been found that any hydratable film-forming edible substance may be employed in the present invention, and these substances may include albumen, gelatin, agar, soy protein, wheat germ, wheat protein, and milk solids, all of which are proteinaceous, and may further include non-protein film-formers such as starch and even methyl cellulose or carboxy methyl cellulose which produce the required edible film structures but are not nutritive. The film formers may be intermixed and proportioned and, further, may have fillers added thereto at any stage in the process prior to drying for altering the flavor and texture of the ultimate product without changing the character of the physical structure or the procedure by which such structure is obtained. In some instances, a hydratable film former may be employed naturally having a filler portion which does not interfere with the proteinaceous portion in producing a cellular structure, but, at the same time, may provide a nutty flavor, particularly when roasted. Such film former is characterized by a comminuted wheat germ. Other solid and liquid fillers and modifiers such as sugar and glycerine may be employed without disturbing the basic procedure.

Respecting the oil component, any edible fat or oil may be employed provided it is in liquid condition when dispersed throughout the gel-like mass.

Thus, it is possible to use fats which are plastic at room temperature but which can be made suitable for purposes of this invention by warming them above the melting point but not to a temperature which would denature, char or burn any of the associated components.

One process for fabricating this product comprises blending the film-forming components with the oil components to form a substantially smooth slurry. The slurry is then agitated at a high speed and during this agitation sufficient water is added to hydrate the film former and, after all of the water is introduced, the high speed agitation is continued until a viscous dispersion results which characterizes the point at which formation of a continuous hydrated film throughout which the oil component is dispersed. The product of this viscous gel-like mass requires but several minutes and can be accomplished with any of the standard high speed food mixers.

This gel-like dispersion is then extruded into sheets, molds or other forming devices and then dried. Since the moisture is present only in the thin cellular film portion, a considerable period of time must be allotted for drying. The larger or thicker the formed dispersion, the longer the time required for effecting the drying. Circulated air at a temperature somewhat below the boiling point of water is found to be adequate for drying the cellular film and usually takes place over a period of from ten to twenty hours. When the gel-like dispersion has been dried to about 1% to 2% moisture, it may then be roasted at a temperature somewhat above the boiling point of water to bring out a nutty flavor.

A large number of hydratable film-forming substances have been utilized in practicing the invention, all of which substances show utility and demonstrate the wide application of the invention. Similarly, a number of oils and melted fats have been experimentally utilized together with various combinations of film formers. In each case, the novel gel-like dispersion was produced in stable form and then, in turn, was dried to produce the nut-like product. Further, the proportions of the components were varied widely. The oil portion was varied from 25.0% to 85.0%, while the hydratable film former varied from 1.5% to 32.0% of the gel-like dispersion. Filler material was added in proportions up to 40% and the water, either wholly or in combination with another component, was varied from 13.5% to 67.0%.

The following examples have been selected as showing the wide application of the invention:

Example I

The following components were utilized in the proportions indicated:

| | Grams |
|---|---|
| Cottonseed oil | 120 |
| Sifted, dried and ground #1 wheat germ | 35 |
| Sucrose | 10 |
| Glycerine | 5 |
| Fresh egg white | 52 |

All of the ingredients except the fresh egg white were blended in a suitable mixer until a smooth slurry was obtained. The slurry was then mixed at high speed and the fresh egg white added. After a few seconds, a viscous dispersion resulted under the high speed mixing which was continued for a two minute period to produce a desirable stable gel-like dispersion. The dispersion was then formed into thin sheets in shallow pans and placed in an air-circulating oven heated to 90° centigrade. The product was dried in the oven for twelve hours until the moisture level reached 2%. The dried product was then subjected to an increased temperature of 140° centigrade for twenty minutes to produce a nut-like roasted flavor with a texture closely simulating cashew nuts. In the instant example, it will be noted that the water component occurred naturally in the egg white.

Example II

| | |
|---|---|
| Corn oil | grams 120 |
| Dried albumen | do 7 |
| Sifted, dried and ground #1 wheat germ | do 35 |
| Glycerine | do 5 |
| Sugar | do 4 |
| Water | millilitres 50 |

The same procedure was carried out as in Example I with water in pure form being added last in place of the fresh egg white. As in the first instance, the characteristic gel-like dispersion was rapidly produced from the original oily slurry. Upon roasting, the simulated nut-like product assumed an almond-like texture.

Example III

| | |
|---|---|
| Sesame oil | grams 120 |
| Sugar | do 10 |
| Corn starch | do 37 |
| Carboxy methyl cellulose | do 5 |
| Water | millilitres 80 |
| Methyl cellulose | grams 2 |

The sesame oil, sugar and corn starch were blended in the mixer until a smooth oily slurry was obtained. The carboxy methyl cellulose was dissolved in the water and added then to the slurry with rapid mixing. After the original gel-like dispersion began to form, the methyl cellulose was added with rapid mixing to further stabilize the dispersion. The resulting gel-like dispersion was then sheeted-out and dried as in Example I. It is to be noted that a simulated nut-like product has been produced in this example without the use of any protein material whatsoever.

Example IV

| | |
|---|---|
| Peanut oil | grams 105 |
| Sifted, dried and ground #1 wheat germ | do 65 |
| Glycerine | do 6 |
| Sugar | do 8 |
| Water | millilitres 80 |

Ingredients other than the water were slurried as in Example II above with the water component being added to convert the slurry to the gel-like dispersion. In this example, the wheat germ component functions both as a film former and as a filler, while the glycerine assists in stabilizing the product and yielding a dried material which, upon roasting, simulates peanuts.

Example V

| | |
|---|---|
| Melted butter | grams 120 |
| Dried albumen | do 7 |
| Sifted, dried and ground #1 wheat germ | do 35 |
| Glycerine | do 5 |
| Sugar | do 4 |
| Water | millilitres 50 |

The same procedure as in Example II was carried out, the ingredients being maintained at 40° centigrade to keep the butter in a melted form. Since the butter was maintained in liquid form, the same characteristic dispersion and entrapped globules were formed in the gel-like dispersion. Upon drying and roasting, the product assumed a nut-like flavor and texture.

Although the particular film former and the particular oily component may be selected from a wide variety of materials, the final structure is always the same, the film former being hard and cellular in nature with the voids or cells retaining the oily constituent in entrapped condition. Also to be noted are the essential and common steps of the procedure according to which an oil component is dispersed throughout a hydrated film forming material to form a viscous gel-like mass and the subsequent drying thereof to harden the same without rupturing the structure and attendant loss of oil.

It will be understood that numerous variations can be made with respect to the foregoing product and process without deviating from the spirit of the invention which embodies the above mentioned essential features.

What is claimed is:

1. A nut-like food product which comprises, an edible hydratable film-forming component in dried continuous cellular phase, and an edible water-immiscible liquid dispersed in discontinuous phase to produce particles thereof individually entrapped in cells of the dried film-forming component.

2. A nut-like food product which comprises, an edible hydratable film-forming component in dried continuous cellular phase, and an oily component dispersed in discontinuous phase to produce particles thereof individually entrapped in cells of the dried film-forming component.

3. A nut-like food product which comprises, an edible hydratable film-forming component in dried continuous cellular phase, and liquid shortening dispersed in discontinuous phase to produce particles thereof individually entrapped in cells of the dried film-forming component.

4. A nut-like food product which comprises, an edible proteinaceous film-forming component in dried continuous cellular phase and an edible oil dispersed in discontinuous phase to produce particles thereof individually entrapped in cells of the dried film-forming component.

5. A nut-like food product which comprises, an edible proteinaceous film-forming component in dried continuous cellular phase, and an oil having a boiling point above 140° centigrade dispersed in discontinuous phase to produce particles thereof individually entrapped in cells of the dried proteinaceous material, said proteinaceous film-forming material having been roasted at a temperature below the boiling point of said oil.

6. A stable dehydratable gel-like dispersion which comprises, an edible hydratable film-forming component, a water-immiscible liquid dispersed uniformly therein in finely divided particle form, and water in sufficient amount to form a continuous hydrated cellular film holding in isolated condition the water-immiscible particles.

7. A process for making a nut-like product which consists in intermixing in slurry form a hydratable film-forming substance with a water-immiscible liquid, hydrating the film-forming substance while beating to disperse the water-immiscible liquid and form a continuous cellular film thereabout, and then slowly drying the cellular film while preserving the continuity thereof.

8. A process for making a nut-like product which consists in intermixing in slurry form a proteinaceous film-forming substance with an oil, hydrating the proteinaceous film-forming substance while beating to disperse the oil and form a continuous proteinaceous cellular film thereabout, slowly drying the proteinaceous film while preserving the continuity thereof, and then roasting to alter the flavor while preserving the structure.

9. A process for making a nut-like product which consists in forming a dispersion of dehydrated film-forming substance in a water-immiscible liquid which is in continuous phase, hydrating and beating to effect a conversion to a dispersion of water-immiscible liquid in the hydrated film-forming substance and converting the latter to continuous phase, and slowly drying the converted dispersion without destroying the continuity of the film.

10. A process for making a nut-like product which consists in hydrating a film-forming substance until it is fluid in nature, intermixing at least one part of water-immiscible liquid for each three parts of hydrated film-forming substance, beating the mixture and dispersing the water-immiscible liquid until a sharp viscosity rise occurs, then slowly drying while preserving a continuous cellular film of film-forming substance around the dispersed liquid.

References Cited in the file of this patent

UNITED STATES PATENTS

| | | |
|---|---|---|
| 1,774,110 | Sloat | Aug. 26, 1930 |
| 2,776,212 | Andregg | Jan. 1, 1957 |

UNITED STATES PATENT OFFICE
Certificate

Patent No. 2,952,544 Patented September 13, 1960

Jack R. Durst and Jolyon A. Stein

Application having been made jointly by Jack R. Durst and Jolyon A. Stein, the inventors named in the patent above identified, and The Pillsbury Company, a corporation of Delaware, the assignee, for the issuance of a certificate under the provisions of Title 35, Section 256 of the United States Code, deleting the name of the said Jolyon A. Stein from the patent as a joint inventor, and a showing and proof of facts satisfying the requirements of the said section having been submitted, it is this 22nd day of May 1962, certified that the name of the said Jolyon A. Stein is hereby deleted from the said patent as a joint inventor with the said Jack R. Durst.

[SEAL]

*First Assistant Commissioner of Patents.*